Aug. 2, 1960 M. O. SEM ET AL 2,947,673
COLLECTION OF GAS FROM FURNACE FOR ELECTROLYTIC
SMELTING PRODUCTION OF ALUMINIUM

Filed March 26, 1958 2 Sheets-Sheet 1

INVENTORS
MATHIAS OVROM SEM
FREDRIK CHRISTEN COLLIN
BY

ATTORNEYS

United States Patent Office 2,947,673
Patented Aug. 2, 1960

2,947,673

COLLECTION OF GAS FROM FURNACE FOR ELECTROLYTIC SMELTING PRODUCTION OF ALUMINIUM

Mathias Ovrom Sem, Smestad, Oslo, and Fredrik Christen Collin, Ljan, Oslo, Norway, assignors to Elektrokemisk A/S, Oslo, Norway, a corporation of Norway Filed Mar. 26, 1958, Ser. No. 724,182

Claims priority, application Norway Mar. 30, 1957

3 Claims. (Cl. 204—67)

The present application is directed to a process for collection and cleaning of anode gas generated in an aluminium cell provided with Soederberg anodes.

As is known aluminium is manufactured by melt electrolysis of a solution of aluminium oxide in molten fluorides. A carbon electrode is employed as the anode in the furnace and during electrolysis the carbon oxidizes to form a gas containing carbon monoxide, carbon dioxide, and small quantities of hydrogen, water vapor and tar fumes. The molten fluorides in the furnace bath also decompose so that the gas contains fluorine compounds. Upon cooling of the gas, part of the fluorine compounds condense as fumes of very low particle size. Because of the contaminates such as tar fumes and fluorine-compounds, the gas is subject to a gas cleaning process before it is released to the atmosphere.

The known gas cleaning processes presently employed are carried out in two separate steps. First the carbon monoxide in the gas is burned to remove the combustible tar fumes. This is a necessary step to avoid clogging of the gas pipe lines by a sticky mixture of dust and condensed tar. Then the burned gas is processed a second time by passing it through scrubbers in a dust cleaning plant to remove dust and fluorine compounds. While burning the furnace gas is effective for removing tar fumes, the dust is a problem since the fine particles tend to pass through all ordinary washing chambers and escape to the atmosphere.

In working with this problem it has now been discovered that it is possible to utilize the tar fumes as a cleaning agent for the removal of fumes of fluorine-compounds which are difficult to catch. To this end it has been found that if the gas is suddenly cooled and agitated as it comes from the furnace in hot concentrated form the tar fumes condense on the dust particles which agglomerate. These agglomerates because of their greater size and weight may be readily removed from the gas.

The tar vapors in the gas have no well defined dew points. A small fraction of the hydrocarbons from the binder in the anode paste will condense on the dust particles at temperatures between 400 and 200° C. Already in this temperature range agglomeration of the fume particles to larger clusters takes place, but as only small amounts of hydro-carbons are condensed, the dust is relatively free flowing and might be separated in a dust chamber or a simple cyclone.

The feed line between the anode gas collection ring and the cyclone have to be insulated to maintain a temperature at or above 200° C. at the cyclone outlet pipe. At lower temperatures a very sticky tar-rich dust is formed, which blocks up the pipe lines. Alternatively the feed line and cyclone might be heated by separate heating elements which might be provided for maintaining a gas temperature of 200° C. or more.

For the complete removal of tar and fumes from fluorine compounds, the gas has to be cooled below 100° C. A very effective way to cool and agitate the hot concentrated furnace gas is to spray a suitable liquid into it at a point where the gas temperature is not less than 200° C. By using a spray of cold liquid the gas will be suddenly cooled while it is being agitated. Cooling the gas below the condensation point of the tar fumes is of advantage as the fumes then tend to condense on the dust nuclei which assists in the formation of the tar-dust agglomerates. Other known ways of cooling and agitating the gas to cause the tar fumes and dust to agglomerate may be employed.

Gas cleaning carried out in accordance with the present invention has in practice proven to be highly effective. Tests have shown that 90% to 95% of the tar fumes are removed from the furnace gas and the clean gas is substantially free of fluorine-containing fumes. The gas produced in accordance with the present invention may be further cleaned to remove HF and the clean gas stored in tanks and used for normal heating purposes or if desired the gas may be employed as a raw material in chemical synthesis as for example in the manufacture of methanol. The clean gas is valuable. For example a large furnace may produce up to 106 cubic feet of gas per hour (32° F. and 760 mm. Hg) having calorific value of about 7920 B.t.u.'s per cubic foot. In an average aluminium plant the heat value of the total quantity of gas produced in a year may be equivalent to about 35,000 to 50,000 tons of coke.

Another advantage of the persent process is that the furnace gas is cleaned while in concentrated form so that its volume is only 5% to 10% of the volume the gas would have if burned.

This is important since it results in a tremendous reduction in the cost of constructing and operating gas cleaning apparatus from that required for cleaning the gas after it is burned in accordance with known processes now in use.

These and other advantages of the present invention may be readily understood by reference to the accompanying drawings in which.

Figure 1:
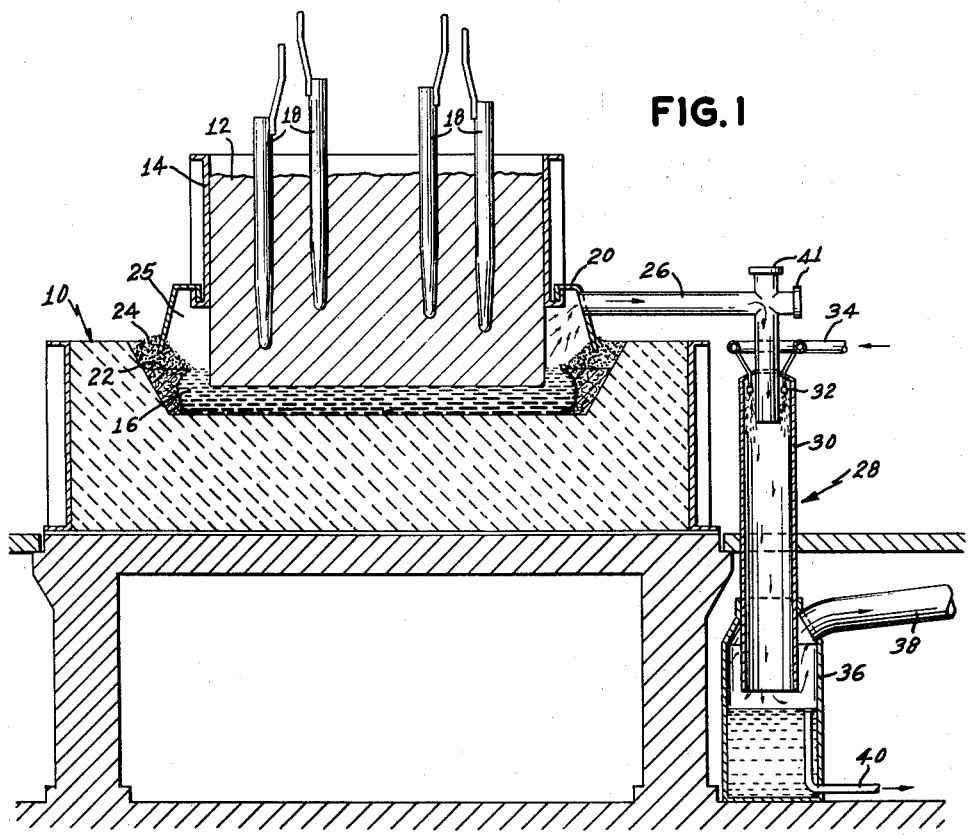
Fig. 1 is a vertical section of an aluminium cell equipped with a suitable apparatus for carrying out the process of the present invention.

Turning now to the drawings 10 is the usual aluminium furnace pot and 12 is the anode, which is a continuous type self-baking Soederberg anode enclosed in a casing 14. The bottom portion of the anode projects down out of the casing into the furnace bath 16 which consists of alumina dissolved in cryolite. Electric power is supplied to the anode by the vertical contact studs 18. Anode 12 is ordinarily made of coke and a pitch binder and may consist of calcined petroleum coke which includes a binding agent such as coal tar-pitch.

During electrolysis the bottom end portion of the anode is slowly consumed. Oxygen from the alumina combines with the carbon of the electrode to form a gas consisting principally of carbon monoxide and carbon dioxide while the volatile matter contaminates the gas with tar fumes. The carbon binder of the electrode generates most of the volatile tar fumes. The gas is further contaminated with fluorine compounds and furnace dust given off by the charge and bath. Furnace gas is collected by any suitable apparatus in accordance with known methods. Examples of particularly effective gas collecting apparatus are described in United States Patents Nos. 2,526,875 and 2,731,407.

The gas collecting apparatus illustrated in the drawings comprises an annular ring 20 which surrounds the electrode and makes a gas-tight seal with electrode casing 14. The body of the ring 20 is flared out away from the electrode and the bottom of the ring ends adjacent to but above the furnace crust 22. An air-tight seal between the furnace crust and the ring is provided by piling powdered alumina 24 on top of the crust to overlap the bottom of the gas collecting ring 20. Gas generated in the furnace collects in the annular cavity 25 formed by the electrode, gas collecting ring, alumina and furnace crust and this gas flows from the cavity into a gas outlet pipe 26.

In the preferred form of invention shown the gas cleaning apparatus 28 for carrying out the present process is located adjacent to the furnace pot and as a result furnace gas entering the apparatus will have a temperature of above 200° C. Gas cleaning apparatus 28 is a very simple and inexpensive structure. It comprises a vertical pipe 30 of larger diameter than gas outlet pipe 26 and as shown in the drawings pipe 30 is mounted coaxially on the discharge end portion of outlet pipe 26. The junction between the two pipes is of course gas-tight and the lower end portion of the gas outlet pipe 26 projects down into the interior of pipe 30. One or more nozzles 32 supplied with fluid through a pipe 34 are arranged in a ring around the discharge end of the gas outlet pipe 26 and the nozzles are preferably arranged to provide a spray of fluid that moves downwardly into the stream of gas flowing in pipe 30. The force of the spray entering the gas stream agitates the gas and tends to promote sudden cooling and turbulent conditions causing the tar fumes and dust particles to agglomerate. The fluid sprayed into the gas may be an inert gas, water or any other liquid that will not create the hazard of an explosion in the system. Excellent results have been achieved with anthracene oil or trichlorethylene.

The tar fume-dust agglomerates because of their size and weight readily settle out of the gas into a collecting tank 36 along with any liquid that is sprayed into the gas. The clean gas leaves the collecting tank through a pipe 38 which may be connected with a plant gas manifold for conveying the clean gas to a main gas scrubbing station. A pipe 40 is provided in collecting tank 36 so that the liquid may be withdrawn from tank 30 cleaned and recycled.

Figure 2:
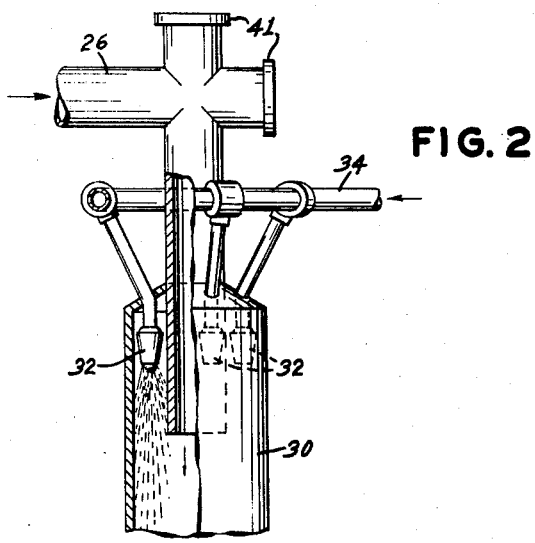
Fig. 2 is an enlarged view of the nozzles employed for spraying a liquid into the furnace gas.

In the form of apparatus shown in Figs. 1 and 2 the spray nozzles are positioned above the discharge opening of pipe 26 and the nozzles are so arranged that the spray will cover the interior wall of pipe 30 as well as the outside wall of pipe 26. When this is done the walls of both of the pipes will tend to remain clean. If desired outlet pipe 26 may be provided with inspection and cleaning doors 41.

The gas cleaning apparatus 28 merely illustrates one form of apparatus for cooling and agitating the furnace gas to form the tar fume-dust agglomerates and the process of the persent invention is not intended to be limited to such apparatus or any details thereof.

Since the gas coming from the furnace contains some fluorine compounds such as hydrogen fluoride the pipes and other apparatus must be made of acid resistant material or equipped with suitable protective coatings. In those cases where a liquid is used to agitate the gas in the cleaning apparatus a material capable of combining with hydrogen fluoride such as sodium carbonate or calcium acid carbonate may be dissolved in the liquid to remove the fluorine compounds.

Figure 3:
Fig. 3 is a photolithographic reproduction of an actual photograph of the tar dust agglomerates formed in accordance with the process of the present invention. The agglomerates have been enlarged fifty times to better illustrate their physical characteristics.

The tar fume-dust agglomerates formed in carrying out the present process are shown in Fig. 3. As there shown the very fine furnace dust particles have been bound together because of the tar into large agglomerates which because of their size and weight may be readily separated from the furnace gas to provide a clean gas substantially free of dust and tar fumes.

It is one of the features of novelty of this application that the washing of the gas takes place immediately adjacent the individual furnace pot. As is well known aluminum plants ordinarily contain a very large number of pots and it is customary to run the exhaust gases from these various pots into the common plant gas manifold referred to above which conveys the gas to a main gas scrubbing station.

It will be understood that it is intended to cover all changes and modifications of the preferred form of the invention herein selected for the purpose of illustration which do not constitute departure from the spirit and scope of the described invention.

What we claim is:

1. In the manufacture of aluminium by melt electrolysis of a solution of aluminium oxides in molten fluorides wherein a furnace gas including carbon monoxide, carbon dioxide, dust and tar fumes is generated the method comprising the steps of collecting the gas in the furnace, withdrawing the collected gas from the furnace, then at a point immediately adjacent such furnace and while the gas temperature is not less than 200° C. subjecting the gas to sudden cooling and agitation by injecting a spray of liquid into the gas stream to condense tar fumes and to create turbulence whereby tar fumes and dust particles are caused to agglomerate and separating the agglomerates from the gas and conducting the gas away from the furnace pot.

2. The method specified in claim 1 which includes the step of cooling and agitating the gas by injecting a spray of water into the furnace gas.

3. The method specified in claim 1 which includes the step of adding a material to the liquid that is capable of combining with the fluorine compounds to remove them from the gas.

References Cited in the file of this patent

UNITED STATES PATENTS 2,731,407    Sem et al. _____ Jan. 17, 1956

OTHER REFERENCES

Perry's Chemical Engineer's Handbook, 3rd Edition, 1950, pages 1034 and 1035.